(12) United States Patent
Kohara et al.

(10) Patent No.: US 8,316,927 B2
(45) Date of Patent: Nov. 27, 2012

(54) LOOP HEAT PIPE WASTE HEAT RECOVERY DEVICE WITH PRESSURE CONTROLLED MODE VALVE

(75) Inventors: Kimio Kohara, Nagoya (JP); Seiji Inoue, Nukata-gun (JP); Yuuki Mukoubara, Kariya (JP); Yasutoshi Yamanaka, Kariya (JP); Masashi Miyagawa, Ichinomiya (JP)

(73) Assignee: Denso Corporation, Kariya (JP)

( * ) Notice: Subject to any disclaimer, the term of this patent is extended or adjusted under 35 U.S.C. 154(b) by 1219 days.

(21) Appl. No.: 11/810,258

(22) Filed: Jun. 5, 2007

(65) Prior Publication Data

US 2007/0284087 A1    Dec. 13, 2007

(30) Foreign Application Priority Data

Jun. 9, 2006  (JP) .................. 2006-160851
Jun. 9, 2006  (JP) .................. 2006-160884

(51) Int. Cl.
    *F28D 15/02* (2006.01)
(52) U.S. Cl. ........ 165/272; 165/273; 165/274; 165/278; 165/41; 165/51; 165/104.21; 165/104.27
(58) Field of Classification Search ............ 165/41, 165/104.21, 104.19, 272, 274, 278, 104.27, 165/273, 51; 237/12.3 B
    See application file for complete search history.

(56) References Cited

U.S. PATENT DOCUMENTS

| | | | | |
|---|---|---|---|---|
| 2,084,571 A | * | 6/1937 | Bordeaux | ................. 237/12.3 B |
| 2,412,168 A | * | 12/1946 | Hoesel | ..................... 237/12.3 B |
| 4,408,655 A | * | 10/1983 | Hashimoto et al. | ...... 165/104.27 |
| 4,693,306 A | * | 9/1987 | Nilson | ...................... 165/104.21 |
| 4,773,476 A | | 9/1988 | Baehrle et al. | |
| 4,781,242 A | * | 11/1988 | Meijer et al. | ................... 165/273 |
| 4,782,890 A | | 11/1988 | Shimodaira et al. | |
| 4,941,526 A | * | 7/1990 | Nilsson | ......................... 165/274 |
| 4,974,667 A | * | 12/1990 | Sun et al. | ......................... 165/41 |
| 6,766,817 B2 | | 7/2004 | da Silva | |
| 6,918,404 B2 | | 7/2005 | da Silva | |

(Continued)

FOREIGN PATENT DOCUMENTS

JP    50-49064    8/1948

(Continued)

OTHER PUBLICATIONS

The Japan Institute of Metals 2003 Spring Meeting Proceedings P346, "Hysteresis of Hydrogen Gas Penetration for SUS-304 and SUS-316", with partial translation.

(Continued)

*Primary Examiner* — John Ford
(74) *Attorney, Agent, or Firm* — Harness, Dickey & Pierce, PLC

(57) ABSTRACT

A waste heat recovery device includes a heat pipe in which a working fluid for transporting heat is enclosed, and a mode-switching valve for switching a heat recovery mode and a heat insulation mode. The heat pipe has a heating part for heating and evaporating the working fluid and a cooling part for cooling and condensing the evaporated working fluid. The heating part is made of a steel through which hydrogen gas permeates about at 500° C. and higher. In the heat recovery mode, the waste heat recovery device recovers heat of exhaust gas by using the heat pipe. Furthermore, in the heat insulation mode, a heat transport from the heating part to the cooling part is stopped.

7 Claims, 8 Drawing Sheets

U.S. PATENT DOCUMENTS

| | | |
|---|---|---|
| 7,066,586 B2 | 6/2006 | da Silva |
| 7,285,255 B2 | 10/2007 | Kadlee et al. |
| 2007/0212281 A1 | 9/2007 | Kadlee et al. |

FOREIGN PATENT DOCUMENTS

| | | | |
|---|---|---|---|
| JP | 48-31544 | | 4/1973 |
| JP | 55-082290 | | 6/1980 |
| JP | 59-66610 | | 5/1984 |
| JP | 60-38375 | | 3/1985 |
| JP | 60-117479 | | 8/1985 |
| JP | 62-252894 | | 11/1987 |
| JP | 62252894 A | * | 11/1987 |
| JP | 63149365 A | * | 6/1988 |
| JP | 01-095289 | | 4/1989 |
| JP | 1-88178 | | 6/1989 |
| JP | 2-71014 | | 5/1990 |
| JP | 2-115015 | | 9/1990 |
| JP | 04-045393 | | 2/1992 |
| JP | 04-060383 | | 2/1992 |
| JP | 04045393 A | * | 2/1992 |
| JP | 04-143596 | | 5/1992 |
| JP | 07-120177 | | 5/1995 |
| JP | 7-120179 | | 5/1995 |
| JP | 08-327188 | | 12/1996 |
| JP | 09-078224 | | 3/1997 |
| JP | 11-256308 | | 9/1999 |
| JP | 2002-137054 | | 5/2002 |
| JP | 2003-172587 | | 6/2003 |
| JP | 2004-174373 | | 6/2004 |
| JP | 2005-066427 | | 3/2005 |

OTHER PUBLICATIONS

Munzel, D., Daimler-Benz AG, "Heat Pipe for Recovery From Exhaust Gas Diesel Engine in a Passenger Car", pp. 586-589.

Japan Nuclear Cycle Development Institute Publication Material, "Hydrogen Gas Permeability of Austenitic and Ferritic Stainless Steel for Component of Fast Reactor Core", with partial translation, Nov. 2002, pp. 1-67.

Office Action dated Oct. 16, 2009 in corresponding Chinese Application No. 2007 10109938.7.

Office Action dated Jul. 19, 2010 in corresponding Chinese Application No. 2007 10109938.7.

Office Action dated Dec. 5, 2008 in Chinese Application No. 2007 10109938.7.

Office Action dated Jan. 11, 2011, in corresponding Japanese Application No. 2006-160851, with English translation thereof.

Electronic mail correspondence from Elson Silva, PhD dated May 6, 2008.

Office Action dated Jul. 12, 2011, in corresponding Japanese Application No. 2006-160851.

Office Action dated Jul. 12, 2011, in corresponding Japanese Application No. 2007-141989.

Notification of Reason(s) for Refusal mailed Jan. 24, 2012 in a corresponding Japanese application No. 2007-141989 with English translation thereof.

Decision of Refusal mailed May 15, 2012 in a corresponding Japanese application No. 2007-141989 with English translation thereof.

Dismissal of Amendment mailed May 15, 2012 in a corresponding Japanese application No. 2007-141989 with English translation thereof.

* cited by examiner

LOOP HEAT PIPE WASTE HEAT RECOVERY DEVICE WITH PRESSURE CONTROLLED MODE VALVE

CROSS REFERENCE TO RELATED APPLICATIONS

This application is based on Japanese Patent Applications No. 2006-160851 filed on Jun. 9, 2006, and No. 2006-160884 filed on Jun. 9, 2006, the contents of which are incorporated herein by reference in its entirety.

BACKGROUND OF THE INVENTION

1. Field of the Invention

The present invention relates to a waste heat recovery device which recovers waste heat of exhaust gas using a heat pipe.

2. Description of the Related Art

Conventionally, a heat pipe including an iron container having therein water is used. The heat pipe is suitably used for various applications because the iron container has a high strength and water has a high performance as a working fluid. However, when iron reacts with water, hydrogen gas is generated, and the hydrogen gas reduces a performance of the heat pipe for a short time.

As a technique for preventing a performance reduction of the heat pipe due to the hydrogen gas, for example, JP-U-50-49064 discloses a heat pipe in which at least a part of a container is made of palladium or a palladium-based alloy through which hydrogen gas permeates. In addition, U.S. Pat. No. 4,782,890 (corresponding to JP-A-6-66486) discloses a heat pipe in which a porous sintered body is arranged in a condensing part of the container. The porous sintered body is made of an oxidizer for oxidizing hydrogen gas into water. Further, U.S. Pat. No. 4,773,476 (corresponding to JP-A-61-76883) discloses a heat pipe which is made of aluminum, steel, or gray cast iron. The whole inner surface of the heat pipe is coated with a waterproof metal (e.g., copper, nickel, copper and nickel) for preventing a generation of hydrogen gas.

However, in the heat pipe disclosed in JP-U-50-49064, at least a part of the container is made of high-priced palladium or a palladium-based alloy, thereby a production cost of the heat pipe may increase compared with a heat pipe made of iron. Further, in the heat pipe disclosed in U.S. Pat. No. 4,782,890, the porous sintered body is arranged in the condensing part of the container, thereby the heat pipe has a complicated structure and a production cost of the heat pipe may increase. In addition, a part of the hydrogen gas generated in the heat pipe may be not oxidized. In the heat pipe disclosed in U.S. Pat. No. 4,773,476, the whole inner surface of the heat pipe is coated by the waterproof metal, thereby a production cost of the heat pipe also increases. Further, when a part of a coating is damaged by a thermal stress and the like, hydrogen gas may be generated, and a performance of the heating pipe may be reduced.

Furthermore, when the waste heat recovery device is used for a long term, noncondensable gas may be generated in the heat pipe, and may reduce a heat transport property of the heat pipe. Thus, the noncondensable gas is required to be removed from the heat pipe. For example, JP-A-55-82290 discloses a method for removing the noncondensable gas from the heat pipe. In the method, the heat pipe is heated so that the working fluid in the heat pipe evaporates and an inside pressure of the heat pipe becomes higher than an outside pressure (air pressure). The noncondensable gas is removed through a slit provided in a sealing part of the heat pipe. Then, the slit is sealed by brazing or welding.

However, the waste heat recovery device in JP-A-55-82290 requires a troublesome work to make the slit in the sealing part of the heat pipe and seal the slit after removing the noncondensable gas, at every time when the noncondensable gas is removed. Further, a part of the evaporated working fluid may be removed with the noncondensable gas. Thus, a performance of the waste heat recovery device may be reduced.

Further, JP-A-8-327188 discloses a noncondensable gas removal device. As shown in FIG. 15, the noncondensable gas removal device includes an adsorption type freezer 100, a first container 120, and a second container 140. The first container 120 is connected to the adsorption type freezer 100 through a first valve 110, and the second container 140 is connected to the first container 120 through a second valve 130. The first container 120 has a first adsorbent 150 which adsorbs water as a coolant at a low temperature and desorbs the water at a high temperature. The second container 140 has a second adsorbent 160 which adsorbs gas. The first valve 110 and the second valve 130 are electrically switched by a control device 170.

When the first valve 110 is opened, water vapor flows from a coolant passage of the adsorption type freezer 100 to the first container 120, and the water vapor is adsorbed by the first adsorbent 150. At the same time, the noncondensable gas in the water vapor is separated from the water vapor and remains in the first container 120. Next, the second valve 130 is opened. The noncondensable gas remaining in the first container 120 flows into the second container 140, and is adsorbed by the second adsorbent 160. Thus, the noncondensable gas is efficiently removed from the coolant passage in the adsorption type freezer 100.

When a waste heat recovery device has the noncondensable gas removal device disclosed in JP-A-8-327188, the waste heat recovery device becomes large, and a production cost may increase.

SUMMARY OF THE INVENTION

In view of the foregoing problems, it is an object of the present invention to provide a waste heat recovery device, which can remove hydrogen gas generated in heat pipe, and can produced a low cost. Another object of the invention is to provide a waste heat recovery device which prevents a leak of a working fluid, and can remove noncondensable gas generated in a heat pipe.

According to a first aspect of the invention, a waste heat recovery device includes a heat pipe in which a working fluid for transporting heat is enclosed, and a mode-switching valve for switching a heat recovery mode and a heat insulation mode. The heat pipe has a heating part for heating and evaporating the working fluid and a cooling part for cooling and condensing the evaporated working fluid. The heating part is made of a steel through which hydrogen gas permeates about at 500° C. and higher. In the heat recovery mode, the waste heat recovery device recovers heat of exhaust gas by using the heat pipe. Furthermore, in the heat insulation mode, a heat transport from the heating part to the cooling part is stopped.

In the heat recovery mode, the working fluid enclosed in the heat pipe evaporates by receiving heat from exhaust gas in the heating part. The working fluid flows from the heating part to the cooling part, and condenses in the cooling part, so that the working fluid transports heat from the heating part to the cooling part. Thus, a temperature of the heating part is not so increased, e.g., about at 300° C. and lower.

In the heat insulation mode, the heat transport from the heating part to the cooling part is stopped. Therefore, the temperature of the heating part is increased to be an approximately same temperature with exhaust gas (e.g., about 500-800° C.). The heating part of the heat pipe is made of the steel through which hydrogen gas permeates about at 500° C. and higher. Thus, hydrogen gas generated in the heat pipe is removed to an outside through the steel forming the heating part.

According to a second aspect of the invention, a waste heat recovery device includes a heat pipe in which a working fluid for transporting heat is enclosed, and a communicating container which receives heat from exhaust gas. The heat pipe has a heating part for heating and evaporating the working fluid and a cooling part for cooling and condensing the evaporated working fluid. The communicating container is disposed to communicate with a space in the heat pipe in which the working fluid evaporates. The communicating container is made of a steel through which hydrogen gas permeates about at 500° C. and higher.

The waste heat recovery device recovers heat at all times. The working fluid enclosed in the heat pipe evaporates by receiving heat from exhaust gas in the heating part. The working fluid flows from the heating part to the cooling part, and condenses in the cooling part, so that the working fluid transports heat from the heating part to the cooling part. Thus, a temperature of the heating part is not so increased, e.g., about at 300° C. and lower.

The communicating container receives heat from exhaust gas, so that a temperature of the communicating container is increased to be about 500° C. and higher. The communicating container is made of the steel through which hydrogen gas permeates about at 500° C. and higher. Thus, hydrogen gas generated in the heat pipe is removed to an outside through the steel forming the communicating container.

According to a third aspect of the invention, a waste heat recovery device includes a heat pipe in which a working fluid for transporting heat is enclosed, and a mode-switching valve for switching a heat recovery mode and a heat insulation mode. The heat pipe has a heating part for heating and evaporating the working fluid and a cooling part for cooling and condensing the evaporated working fluid. The heating part has a getter which is nitrided and oxidized about at 500° C. and higher. In the heat recovery mode, the waste heat recovery device recovers heat of exhaust gas by using the heat pipe. Furthermore, in the heat insulation mode, the heat transport from the heating part to the cooling part is stopped.

In the heat recovery mode, the working fluid enclosed in the heat pipe evaporates by receiving heat from exhaust gas in the heating part. The working fluid flows from the heating part to the cooling part, and condenses in the cooling part, so that the working fluid transports heat from the heating part to the cooling part. Thus, a temperature of the heating part is not so increased, e.g., about at 300° C. and lower.

In the heat insulation mode, the heat transport from the heating part to the cooling part is stopped. Therefore, the temperature of the heating part is increased to be an approximately same temperature with exhaust gas (e.g., about 500-800° C.). The heating part has the getter which is nitrided and oxidized about at 500° C. and higher. Thus, nitrogen gas and oxygen gas generated in the heat pipe is removed by the getter. Therefore, the waste heat recovery device prevents a leak of the working fluid from the heat pipe.

According to a fourth aspect of the invention, a waste heat recovery device includes a heat pipe in which a working fluid for a heat transport is enclosed, and a communicating container receiving heat from exhaust gas. The heat pipe has a heating part for heating and evaporating the working fluid and a cooling part for cooling and condensing the evaporated working fluid. The communicating container is provided to communicate with a space in the heat pipe in which the working fluid evaporates and becomes a gaseous state, and a heating part has a getter which is nitrided and oxidized about at 500° C. and higher.

In the waste heat recovery device, nitrogen gas and oxygen gas generated in the heat pipe flow into the communicating container with the working fluid evaporates by receiving heat from exhaust gas. When the getter in the communicating container is heated to be about 500° C. and higher, the getter removes the nitrogen gas and the oxygen gas. Therefore, the waste heat recovery device prevents a leak of the working fluid from the heat pipe.

BRIEF DESCRIPTION OF THE DRAWINGS

Additional objects and advantages of the present invention will be more readily apparent from the following detailed description of preferred embodiment when taken together with the accompanying drawings. In the drawings.

DETAILED DESCRIPTION OF THE PREFERRED EMBODIMENTS (First Embodiment)

Figure 1:
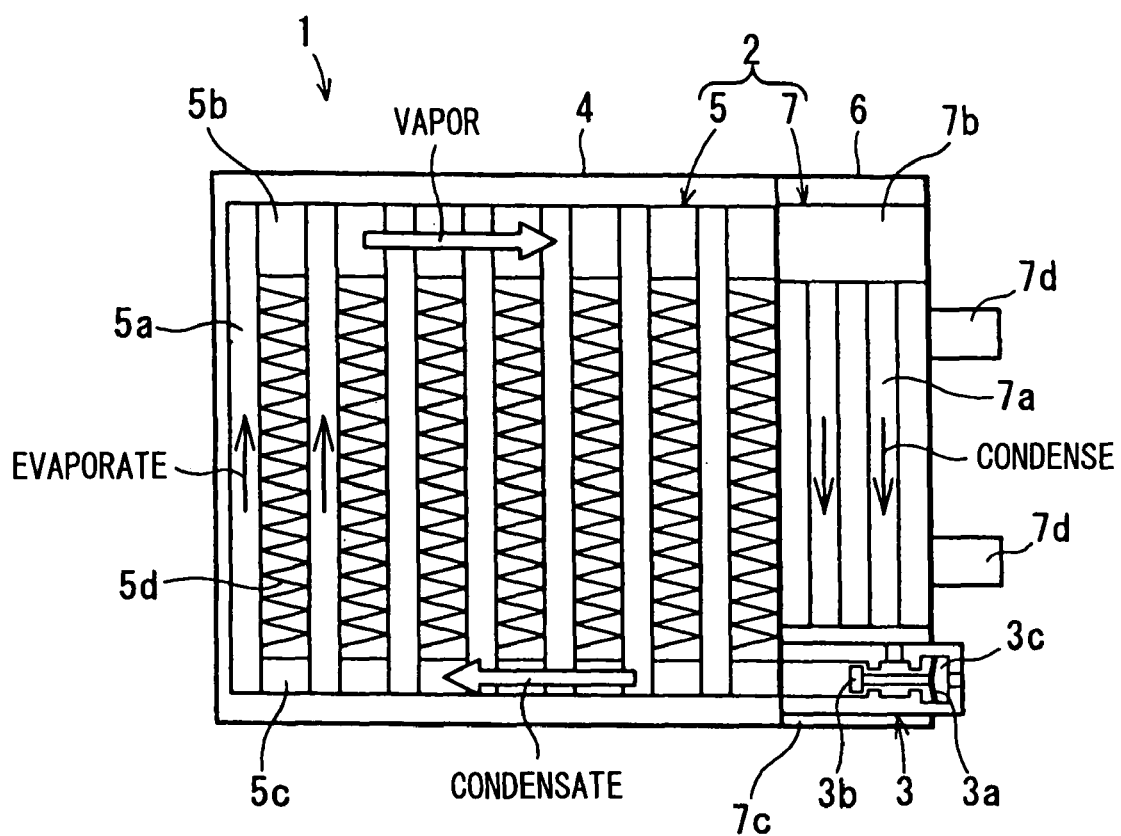
FIG. 1 is a front view of a waste heat recovery device according to a first embodiment of the invention.

A waste heat recovery device 1 according to a first embodiment of the invention can be used for recovering waste heat of exhaust gas generated from a vehicle engine, and transmitting the waste heat to engine-cooling water. The waste heat recovery device 1 includes a loop-typed heat pipe 2, a mode-switching valve 3, an exhaust gas passage 4, and a cooling tank 6. The heat pipe 2 has a closed container in which a working fluid (e.g., water) is enclosed. As shown in FIG. 1, the closed container has a heating part 5 disposed in the exhaust gas passage 4, and a cooling part 7 disposed in the cooling tank 6. The heating part 5 and the cooling part 7 are connected in a closed circuit by a vapor passage and a liquid passage.

Figure 16:
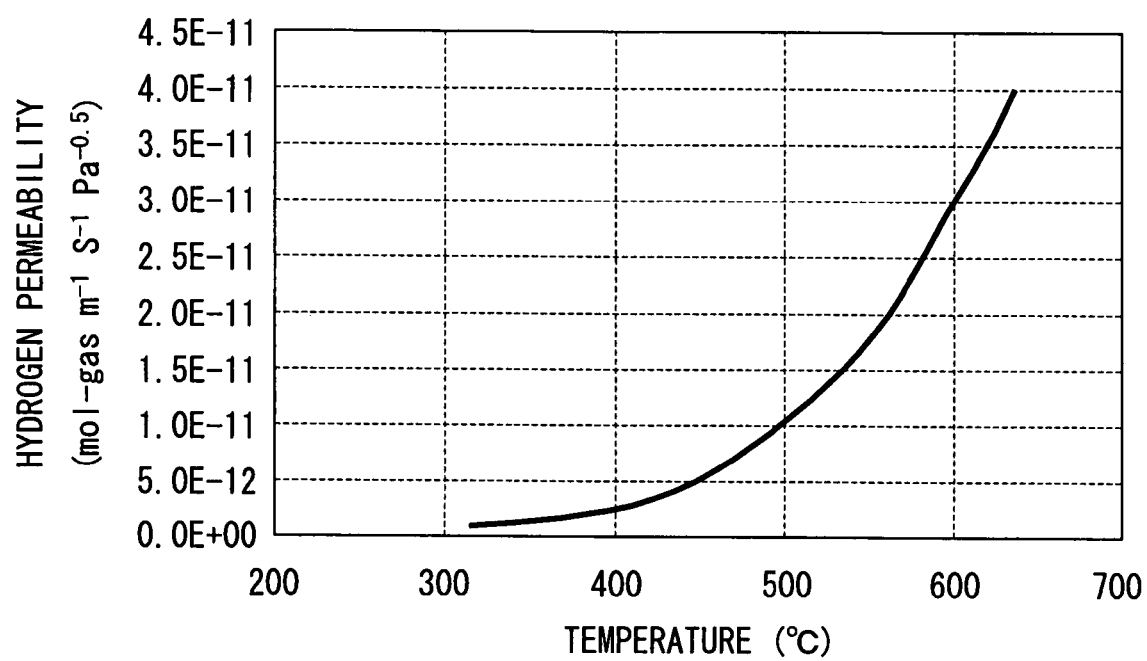
FIG. 16 is a graph showing a relationship between a temperature and a hydrogen permeability of austenite stainless steel.

The heating part 5 includes a plurality of heating tubes 5*a* in which the working fluid flows, a pair of heating headers 5*b* and 5*c* which are connected with the heating tubes 5*a*, and heat-transmit fins 5*d* attached to outside walls of the heating tubes 5*a*. In the heating part 5, the working fluid (i.e., working liquid) stored in the heating tubes 5*a* is heat exchanged with exhaust gas flowing in the exhaust gas passage 4. The heating tubes 5*a* are disposed between the pair of heating headers 5*b* and 5*c*, and are arranged in parallel to each other at approximately even intervals. Between the adjacent heating tubes 5*a*, the heat-transmit fins 5*d* are arranged respectively. Specifically, the heating part 5 has a similar structure with a radiator for cooling engine-cooling water, for example. In the first embodiment, a steel (e.g., stainless steel), through which hydrogen gas permeates about at 500° C. and higher (as shown in FIG. 16), can be used as a material for the heating part 5, for example. As shown in FIG. 16, when a temperature is high, a hydrogen permeability of stainless steel (e.g., austenite stainless steel) increases.

At a high temperature, stainless steel is permeated by hydrogen gas easily, and has a high strength. Stainless steel also has a high corrosion resistance and a high oxidation resistance.

The cooling part 7 includes a plurality of cooling tubes 7*a* in which the working fluid flows, and a pair of cooling headers 7*b* and 7*c* which are connected with the cooling tubes 7*a*. In the cooling part 7, the working fluid (i.e., working gas) flowing in the cooling tubes 7*a* is heat exchanged with engine-cooling water flowing in the cooling tank 6. The cooling tank 6 is connected to an engine-cooling water circuit (not shown) through two connecting pipes 7*d*.

The heating part 5 and the cooling part 7 are connected in the closed circuit through the heating headers 5*b* and 5*c* and the cooling headers 7*b* and 7*c*. Specifically, upper heating header 5*b* is connected with upper cooling header 7*b*, and lower heating header 5*c* is connected with lower heating header 7*c*. When the working liquid receives heat from exhaust gas in the heating part 5, the working liquid evaporates, and vapor of the working liquid (i.e., working gas) flows from the upper heating header 5*b* to the upper cooling header 7*b*. Then, the working gas is cooled and condensed by engine-cooling water in the cooling part 7, and the working liquid (condensate) flows from the lower cooling header 7*c* to the lower heating header 5*c*. The upper heating header 5*b* and the upper cooling header 7*b* form the vapor passage, and the lower heating header 5*c* and the lower cooling header 7*c* form the liquid passage.

The mode-switching valve 3 is disposed in the lower cooling header 7*c*, for example. The mode-switching valve 3 is a diaphragm valve having a diaphragm 3*a* and a valve body 3*b*. The diaphragm valve 3 is not required to be controlled electrically, thereby the diaphragm valve 3 is prevented from an electric trouble. Thus, the waste heat recovery device 1 can be operated with a high reliability. The diaphragm 3*a* displaces in accordance with a pressure of the working liquid flowing into the lower cooling header 7*c*. The valve body 3*b* opens/closes the liquid passage in conjunction with a displacement of the diaphragm 3*a*. The mode-switching valve 3 switches a heat recovery mode and a heat insulation mode. In the heat recovery mode, the working fluid transports heat from the heating part 5 to the cooling part 7. In the heat insulation mode, the working fluid is prevented from transporting heat from the heating part 5 to the cooling part 7. Specifically, when a difference between the pressure of the working fluid and a pressure (e.g., air pressure) introduced in a diaphragm room 3*c* is lower than a predetermined value of the mode-switching valve 3, the diaphragm 3*a* displaces to a left side in FIG. 1, so that the valve body 3*b* opens the liquid passage, so that the heat recovery mode is set by the mode-switching valve 3. In contrast, when the difference is higher than the predetermined value, the diaphragm 3*a* displaces to a right side in FIG. 1, so that the valve body 3*b* closes the liquid passage, so that the heat insulation mode is set by the mode-switching valve 3.

The waste heat recovery device 1 transmits heat from exhaust gas to engine-cooling water when a temperature of the engine-cooling water is low, and insulates heat when the temperature of the engine-cooling water is high. In other words, when the water temperature is low (e.g., at about 70° C. or less), the pressure of the working fluid which presses the diaphragm 3*a* is low, and the difference with air pressure is lower than the predetermined value. When the water temperature increases and the pressure of the working fluid becomes high, the difference with air pressure becomes higher than the predetermined value. Thus, the mode-switching valve 3 closes the liquid passage, so that the heat insulation mode is set. Alternatively, the mode-switching valve 3 may be set in such a manner that when the temperature of exhaust gas increases and the pressure of the working fluid becomes higher than a predetermined value, the mode-switching valve 3 closes the liquid passage, so that the heat insulation mode is set.

Figure 2:
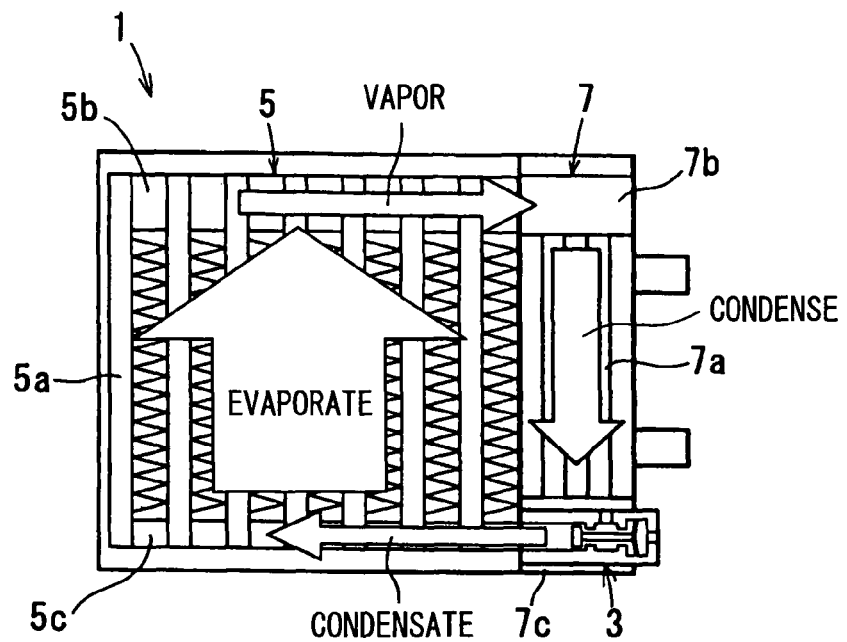
FIG. 2 is a front view of the waste heat recovery device in a heat recovery mode.

In the heat recovery mode, the working liquid enclosed in the heat pipe 2 evaporates by receiving heat from the exhaust gas, as shown in FIG. 2. The working gas (vapor) flows into the cooling part 7 through the vapor passage (i.e., from the upper heating header 5*b* to the upper cooling header 7*b*), and transmits an evaporative latent heat to engine-cooling water so that the working gas condenses. The condensed working liquid (condensate) flows into the heating part 5 through the liquid passage (i.e., from the lower cooling header 7*c* to the lower heating header 5*c*). The working fluid continuously evaporates and condenses. Thus, the engine-cooling water recovers waste heat of the exhaust gas efficiently. The temperature of the engine-cooling water is increased by the evaporative latent heat, and the heated engine-cooling water is used for an engine warm-up and a heat source of a heater, for example. In the heat recovery mode, the working fluid continuously transports heat from the heating part 5 to the cooling part 7. Therefore, a temperature of the heating part 5 (i.e., a surface temperature of the heating tubes 5*a*) is not so increased, e.g., about at 300° C. and lower.

Figure 3:
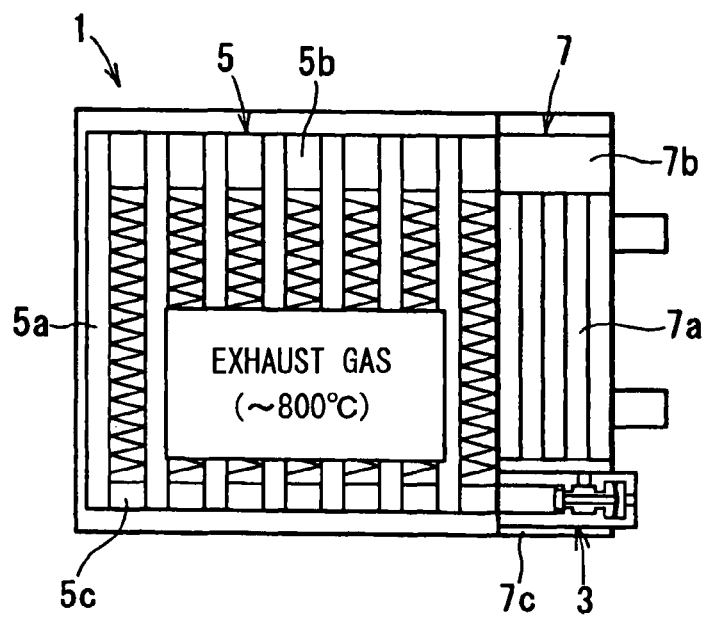
FIG. 3 is a front view of the waste heat recovery device in a heat insulation mode.

In the heat insulation mode, the working fluid is prevented from circulating between the heating part 5 and the cooling part 7. Therefore, the heat transport from the heating part 5 to the cooling part 7 is stopped. The working liquid is stored in the cooling part 7, and the temperature of the heating part 5 increases to be an approximately same temperature with exhaust gas (e.g., about 500-800° C.) as shown in FIG. 3. The heat pipe 2 is the closed container and water as the working fluid is enclosed therein. The heating part 5 of the heat pipe 2 is made of the steel. Therefore, iron reacts with water and generates hydrogen gas as shown in the following formula (1).

$$2Fe + 3H_2O \rightarrow Fe_2O_3 + 3H_2 \tag{1}$$

However, the steel (stainless steel) is permeated by hydrogen gas about at 500° C. and higher. Thus, hydrogen gas generated in the heat pipe 2 is removed to an outside through the steel forming the heating part 5.

When the heating part 5 of the heat pipe 2 is heated to be about 500° C. and higher (i.e., in the heat recovery mode), the hydrogen gas generated in the heat pipe 2 is removed to the outside through the steel. Thus, the heating part 5 is not required to be made of high-priced palladium and the like, and the heat pipe 2 is not required to have a waterproof metal film on the whole surface thereof. Therefore, according to the first embodiment, the waste heat recovery device 1 can be produced at low cost. Further, the hydrogen gas is removed through the steel which forms the heating part 5, and the heat pipe 2 is not required to have a porous sintered body made of an oxidizer. Therefore, the heat pipe 2 has a simple structure.

(Second Embodiment)

The waste heat recovery device 1 according to the first embodiment includes the mode-switching valve 3 for switching the heat recovery mode and the heat insulation mode. However, a waste heat recovery device 1 according to a second embodiment recovers waste heat at all times. For example, the waste heat recovery device 1 according to the second embodiment includes a communicating container 9 which communicates with an inner space of the heat pipe 2. The communicating container 9 is disposed in the exhaust gas passage 4 so that the communicating container 9 is exposed to exhaust gas flowing in the exhaust gas passage 4 and communicates with the inner space (e.g., the heating part 5) of the heat pipe 2 through a communicating pipe 10. In the inner space, the working liquid evaporates and becomes vapor. The communicating container 9 is made of a steel (e.g., stainless steel) through which hydrogen gas permeates about at 500° C. and higher.

The waste heat recovery device 1 according to the second embodiment, the heat pipe 2 recovers waste heat at all times. Thus, the working liquid evaporates by receiving heat from the exhaust gas in the heating part 5, and the working gas transports the evaporative latent heat to the cooling part 7, so that the waste heat of exhaust gas is transported from the heating part 5 to the cooling part 7. In this case, the temperature of the heating part 5 (i.e., the surface temperature of the heating tubes 5a) is not so increased (e.g., about at 300° C. and lower). In contrast, the communicating container 9 which communicating with the heat pipe 2 is exposed to exhaust gas so that the communicating container 9 is heated to be about 500° C. and higher. The communicating container 9 is made of the steel through which hydrogen gas permeates about at 500° C. and higher. Therefore, the hydrogen gas generated in the heat pipe 2 is removed to the outside through the steel forming the communicating container 9.

Figure 4:
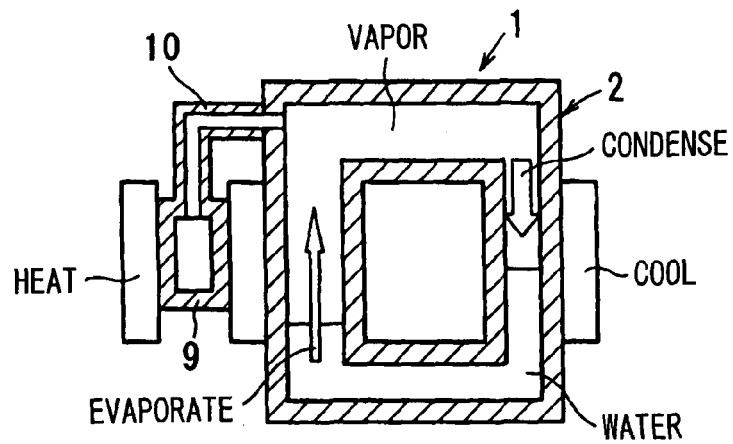
FIG. 4 is a schematic cross-sectional view of a waste heat recovery device according to a second embodiment.
Figure 5:
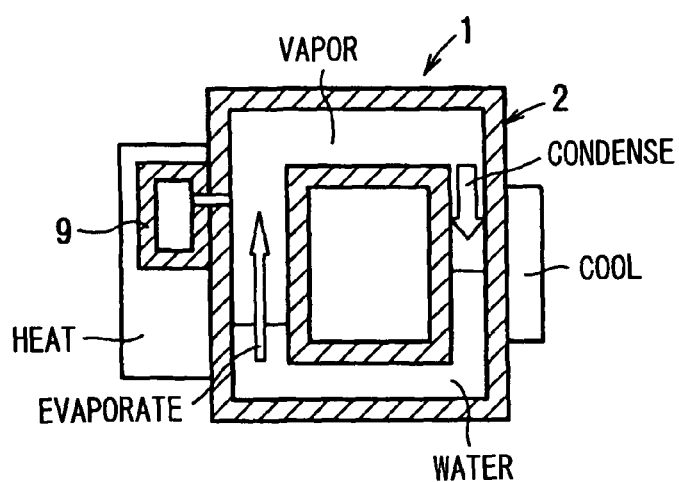
FIG. 5 is a schematic cross-sectional view of a waste heat recovery device according to a first modification example of the second embodiment.

The waste heat recovery device 1 in FIG. 4, the communicating container is connected with the heat pipe 2 through the communicating pipe 10. However, the communicating container 9 may be arranged adjacent to the heat pipe 2 as shown in FIG. 5 without using the communicating pipe 10. In this case, the communicating pipe 10 in FIG. 4 is not required.

Figure 6:
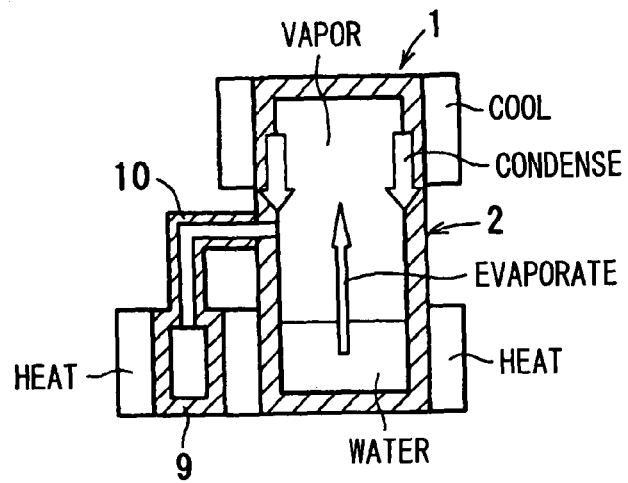
FIG. 6 is a schematic cross-sectional view of a waste heat recovery device according to a second modification example of the second embodiment.

In the waste heat recovery devices 1 in FIGS. 4 and 5, the heat pipes 2 are the loop-typed heat pipes. Alternatively, the heat pipe 2 may be a single-pipe typed as shown in FIG. 6.

(Third Embodiment)

Figure 7:
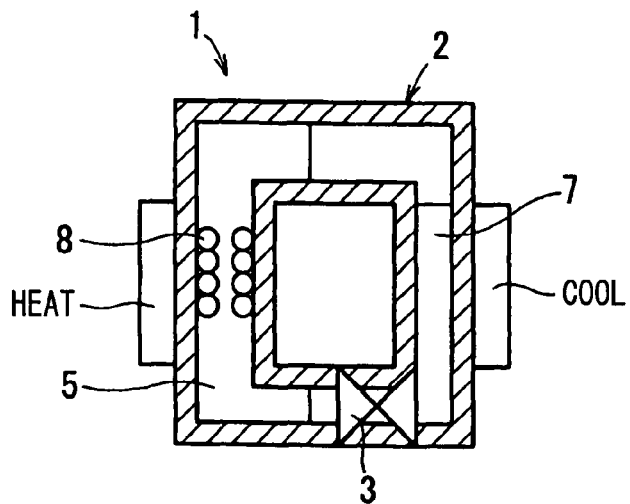
FIG. 7 is a schematic cross-sectional view of a waste heat recovery device according to a third embodiment.

A waste heat recovery device 1 according to a third embodiment has getters 8 arranged in the heating tubes 5a of the heating part 5, as shown in FIG. 7. The getters 8 are nitrided and oxidized about at 500° C. and higher. For example, the getters 8 are made of a material including at least one of niobium, titanium, tantalum, zirconium, nickel, chromium and tungsten (e.g., niobium-containing stainless, nickel-containing stainless, and chrome-containing stainless). In the third embodiment, the getters 8 are made of niobium-containing stainless, for example. Other parts of the waste heat recovery device 1 according to the third embodiment are similar with those of the first embodiment.

In the heat insulation mode, the working fluid is prevented from flowing between the heating part 5 and the cooling part 7. Therefore, the heat transport from the heating part 5 to the cooling part 7 is stopped. The working liquid is stored in the cooling part 7, and the temperature of the heating part 5 increases to be an approximately same temperature with the exhaust gas (e.g., about 500-800° C.). Thus, nitrogen and oxygen generated in the heat pipe 2 are removed by the getters 8 arranged in the heating part 5.

The waste heat recovery device 1 is not required to have a slit in a sealing part of the heat pipe 2, thereby the working fluid is prevented from leaking from the heat pipe 2. Further, in the waste heat recovery device 1, nitrogen gas and oxygen gas are not required to be separated from the working gas. Therefore, a container for separating nitrogen gas and oxygen gas is not required. As a result, the waste heat recovery device 1 becomes small, and can be provided at a low cost.

Figure 8:
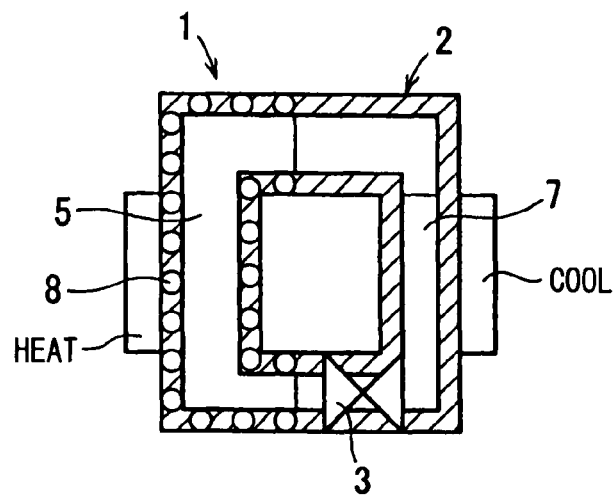
FIG. 8 is a schematic cross-sectional view of a waste heat recovery device according to a first modification example of the third embodiment.
Figure 9:
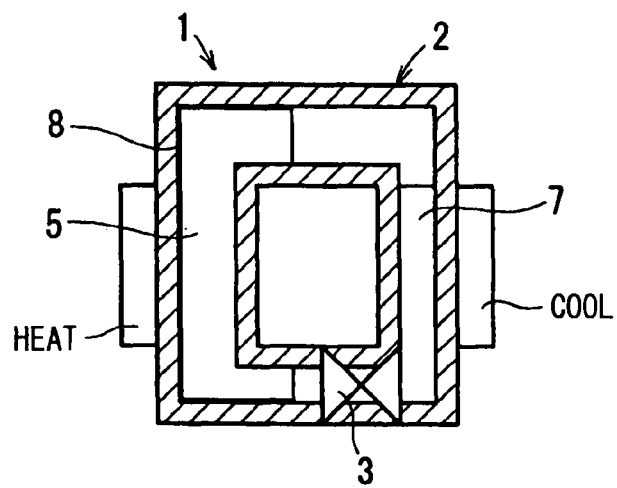
FIG. 9 is a schematic cross-sectional view of a waste heat recovery device according to a second modification example of the third embodiment.

Alternatively, the heating tubes 5a of the heating part 5 may be formed to includes the getters 8, as shown in FIG. 8. The getters 8 may form only inner walls of the heating tubes 5a. When the heating tubes 5a are exposed to high-temperature exhaust gas and the heating tubes 5a cannot be formed by the getters 8, the heating tubes 5a may have inner walls formed by the getters 8, and outer walls made of another material which has a heat resistance. Further, the heating tubes 5a of the heating part 5 may be coated with the getter 8, as shown in FIG. 9. In each case, nitrogen and oxygen generated in the heat pipe 2 are removed by the getters 8.

(Fourth Embodiment)

Figure 10:
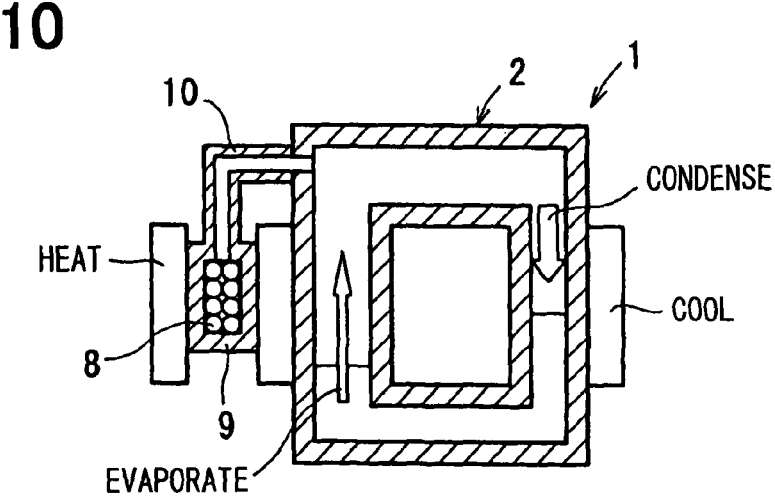
FIG. 10 is a schematic cross-sectional view of a waste heat recovery device according to a fourth embodiment.

The waste heat recovery device 1 according to the third embodiment includes the mode-switching valve 3 for switching the heat recovery mode and the heat insulation mode. In contrast, a waste heat recovery device 1 according to a fourth embodiment recovers waste heat at all times, similarly with that of the second embodiment. For example, the waste heat recovery device 1 according to the fourth embodiment includes a communicating container 9 which communicates with the inner space of the heat pipe 2. The communicating container 9 is disposed in the exhaust gas passage 4 so that the communicating container 9 is exposed to exhaust gas flowing in the exhaust gas passage 4 and communicates with an inner space (e.g., the heating part 5) of the heat pipe 2 through a communicating pipe 10, as shown in FIG. 10. In the inner space of the heat pipe 2, the working fluid evaporates to be vapor.

The communicating container 9 has therein the getters 8 similar with those of the third embodiment. For example, the getters 8 may be arranged in the communicating container 9. Alternatively, the getters 8 may form at least a part of the communicating container 9. Further, the getters 8 may coat on an inner wall of the communicating container 9.

The waste heat recovery device 1 according to the fourth embodiment, the heat pipe 2 recovers waste heat at all times. The nitrogen gas and oxygen gas generated in the heat pipe 2 flow into the communicating container 9 with the vapor of the working fluid evaporated in the heating part 5. The getters 8 of the communicating container 9 are heated by the exhaust gas to be about 500° C. and higher, thereby, the getters 8 remove the nitrogen gas and oxygen gas.

Similarly with the waste heat recovery device 1 according to the third embodiment, the waste heat recovery device 1 according to the fourth embodiment is not required to have a slit in a sealing part of the heat pipe 2, thereby, the working fluid is prevented from leaking from the heat pipe 2. Further, in the waste heat recovery device 1, nitrogen gas and oxygen gas are not required to be separated from the working gas. Therefore, a container for separating nitrogen gas and oxygen gas is not required. As a result, the waste heat recovery device 1 becomes small, and can be provided at a low cost.

Figure 11:
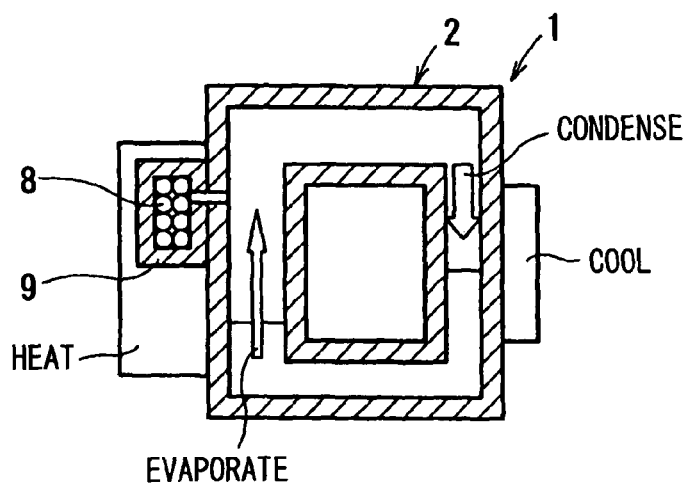
FIG. 11 is a schematic cross-sectional view of a waste heat recovery device according to a first modification example of the fourth embodiment.

The waste heat recovery device 1 in FIG. 10, the communicating container 9 is connected with the heat pipe 2 through the communicating pipe 10. However, the communicating container may be arranged adjacent to the heat pipe 2 as shown in FIG. 11. In this case, the communicating pipe 10 in FIG. 10 is not required.

Figure 12:
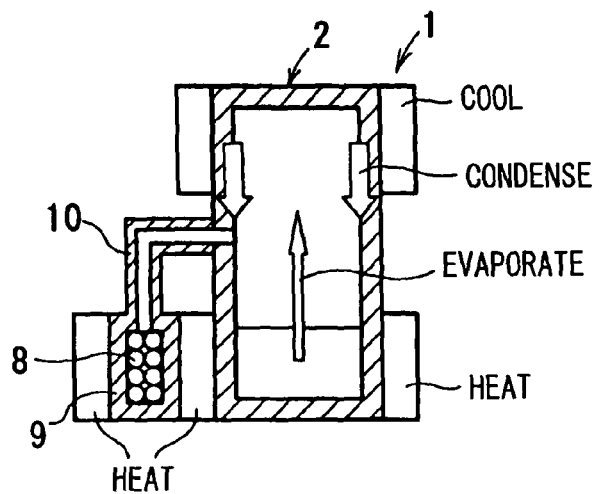
FIG. 12 is a schematic cross-sectional view of a waste heat recovery device according to a second modification example of the fourth embodiment.

In the waste heat recovery devices 1 in FIGS. 10 and 11, the heat pipes 2 are loop-typed heat pipes. Alternatively, the heat pipe 2 may be a single-pipe typed as shown in FIG. 12.

(Fifth Embodiment)

As an example of the mode-switching valve 3, the diaphragm valve 3 having a diaphragm 3a which displaces in accordance with a pressure of the working fluid is described in the first and third embodiments. The pressure of the working fluid is changed in accordance with not only the temperature of the working fluid but also the temperature of exhaust gas which heat exchanges with the working fluid. Thus, the mode-switching valve 3 can be located to open and close the liquid passage in accordance with the temperature of exhaust gas.

Figure 13A:
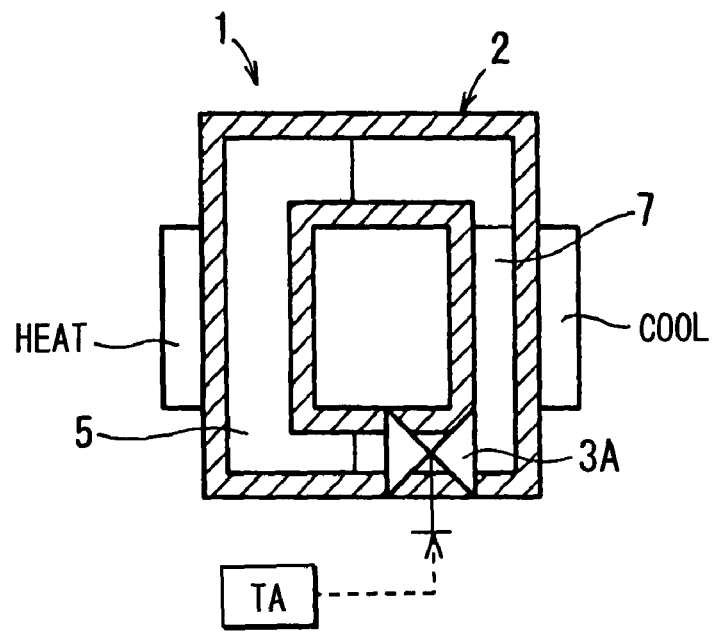
FIG. 13A is a schematic cross-sectional view showing an example of a waste heat recovery device according to a fifth embodiment.

Furthermore, in this embodiment, the mode-switching valve 3 may be a first thermostat valve 3A which senses a temperature TA of exhaust gas, as shown in FIG. 13A. The first thermostat valve 3A is opened and closed in accordance with the temperature TA of exhaust gas.

Figure 13B:
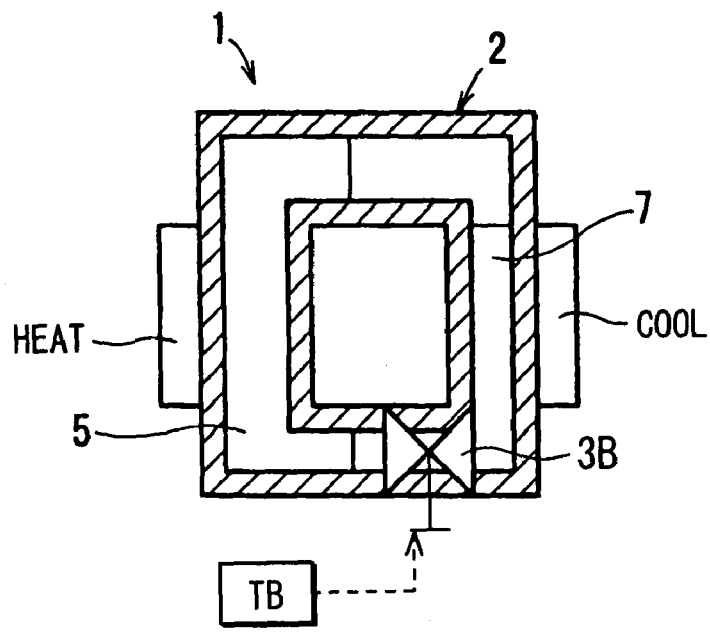
FIG. 13B is a schematic cross-sectional view showing another example of the waste heat recovery device according to the fifth embodiment.

Alternatively, the mode-switching valve 3 may be a second thermostat valve 3B which senses a temperature TB of the working fluid, as shown in FIG. 13B. The second thermostat valve 3B is opened and closed in accordance with the temperature TB of the working fluid.

Figure 14:
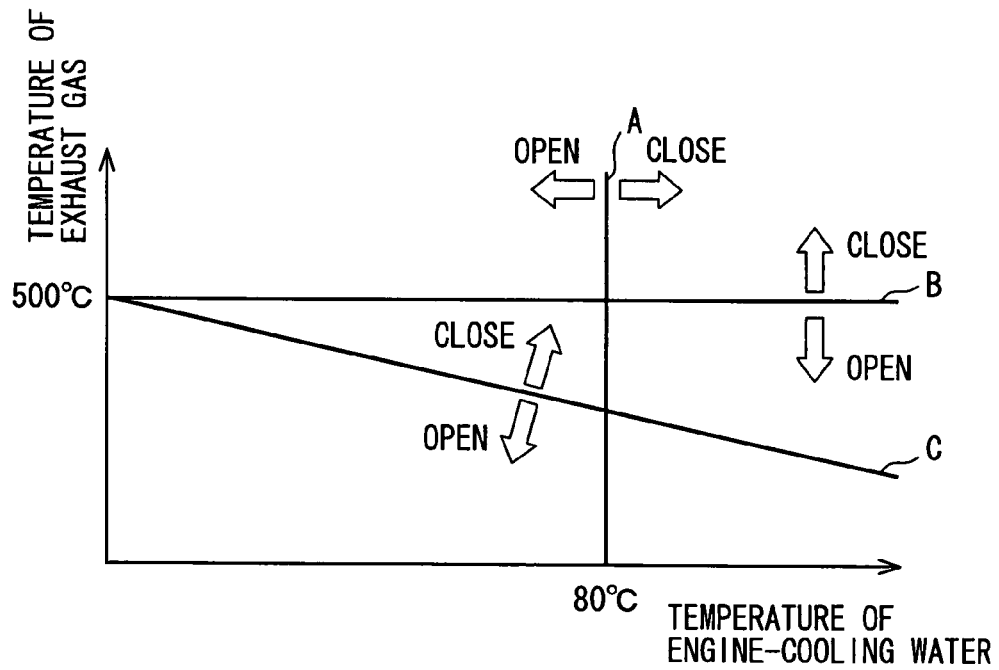
FIG. 14 is a graph showing valve open and close states A, B, C, in accordance with a temperature of engine-cooling water, a temperature of exhaust gas, and a temperature or pressure of the working fluid.
Figure 15:
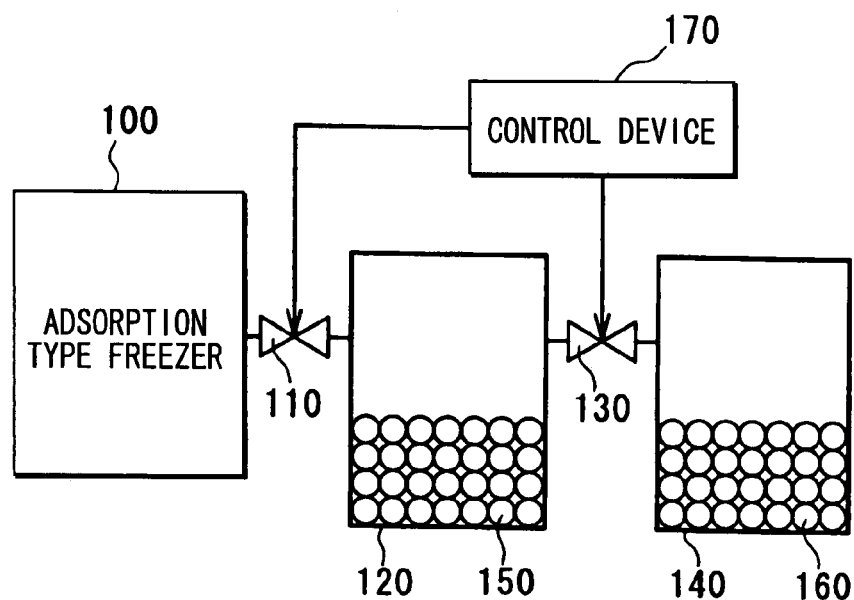
FIG. 15 is a schematic diagram of a noncondensable gas removal device according to a prior art.

FIG. 14 is a graph showing valve open and close states A, B, C, in accordance with a temperature of engine-cooling water, a temperature of exhaust gas, and a temperature of the working fluid.

In the state A of FIG. 14, where the mode-switching valve 3 is switched in accordance with the temperature of engine-cooling water, the mode-switching valve 3 may remain in an open state (i.e., heat recovery mode) when the temperature of exhaust gas is over a predetermined temperature (e.g., about at 500° C. and higher). In this case, the temperature of the heating part 5 of the heat pipe 2 may become lower than the predetermined temperature. As a result, hydrogen gas may not penetrate through the heating part 5 made of the steel, or nitrogen gas and oxygen gas may not be removed by the getter 8.

However, when the mode-switching valve 3 (3A) is switched in accordance with the temperature of exhaust gas as in the state B in FIG. 14, the mode-switching valve 3 (3A) is closed (i.e., heat insulation mode) when the temperature of exhaust gas is over the predetermined temperature. Thus, the temperature of the heating part 5 is increased to be an approximately same temperature as that of the exhaust gas, thereby, hydrogen gas can penetrate through the heating part 5 made of the steel, or nitrogen gas and oxygen gas can be removed by the getter 8.

Further, when the mode-switching valve 3 (3B) is switched in accordance with the temperature or pressure in the heat pipe 2 (i.e., the temperature or pressure of the working fluid) as in the state C of FIG. 14, the mode-switching valve 3 (3B) can be closed when the temperature of exhaust gas is over the predetermined temperature.

(Other Embodiments)

Although the present invention has been fully described in connection with the preferred embodiments thereof with reference to the accompanying drawings, it is to be noted that various changes and modifications will become apparent to those skilled in the art.

For example, in the first embodiment, the heating part 5 of the heat pipe 2 is made of the steel. In addition, the cooling part 7 may be made of the same steel. In the first, third and fifth embodiments, the diaphragm valve 3, the first thermostat valve 3A or the second thermostat valve 3B is used as the mode-switching valve 3, for example. However, the mode-switching valve may be an electromagnetic valve which is controlled by an electric signal. In this case, the heat recovery mode and the heat insulation mode are switched easily and appropriately. The electric valve may have a sensor for detecting the temperature of the exhaust gas, and the electric valve may be switched in accordance with the detected temperature. Alternatively, the mode-switching valve 3 may be controlled by a manual operation. In each case, the mode-switching valve 3 is disposed in a passage between the heating part 5 and the cooling part 7 to open and close the passage.

The heat pipe 2 in the third embodiment has the heating part 5 and the cooling part 7 which are formed by brazing. Specifically, two moldings formed by press moldings are connected by a brazing member to form each of the heating tubes 5a. The brazing member may be made of the getter 8 (e.g., titanium-containing nickel brazing filler metal). In this case, when the working gas evaporating in the heating part 5 touches the brazing member, the getter 8 in the brazing member removes nitrogen gas and oxygen gas.

When an inner fin is inserted in each of the heating tubes 5a for promoting a heat transmission of the heating tubes 5a, the inner fin may be made of the getter 8. In this case, when the working gas evaporating in the heating part 5 touches the inner fin, the getter 8 in the inner fin removes nitrogen gas and oxygen gas.

When a wick is arranged in the heat pipe 2, the wick may be made of the getter 8. In this case, when the working gas evaporating in the heating part 5 touches the wick, the getter 8 in the wick removes nitrogen gas and oxygen gas. The wick sucks up the working liquid by capillary action for improving a wettability of the heating part 5. As a material to form the wick, a sintered body, a mesh, a porous body, or a forming body may be used.

Such changes and modifications are to be understood as being within the scope of the present invention as defined by the appended claims.

What is claimed is:

1. A waste heat recovery device, comprising:
   a heat pipe in which a working fluid for transporting heat is enclosed, wherein the heat pipe has a heating part for heating and evaporating the working fluid and a cooling part for cooling and condensing the evaporated working fluid; and a mode-switching valve, which switches a heat recovery mode for recovering heat of exhaust gas by using the heat pipe, and a heat insulation mode for stopping a heat transport from the heating part to the cooling part, wherein:

the heating part is made of a steel through which hydrogen gas permeates at about 500 ° C. and higher; wherein the mode switching valve is disposed in a passage between the heating part and the cooling part at a downstream side of the cooling part and is a diaphragm valve having a diaphragm which displaces in accordance with a pressure difference between a pressure of the working fluid at the downstream side of the cooling part and a pressure introduced from air outside of the heat pipe into a diaphragm room partitioned from the working fluid within the heat pipe; and the mode switching valve is open or closed in accordance with the pressure difference.

2. The waste heat recovery device according to claim 1, wherein:

the heating part is made of stainless steel.

3. The waste heat recovery device according to claim 1, wherein:

the cooling part is located to be cooled by engine-cooling water.

4. The waste heat recovery device according to claim 1, wherein:

the heating part has a getter which is nitrided and oxidized about at 500 ° C. and higher.

5. The waste heat recovery device according to claim 1, wherein:

the heat pipe includes a looped-typed heat pipe.

6. The waste heat recovery device according to claim 1, wherein the mode-switching valve is switched to set the heat insulation mode based on the pressure of the working fluid when the temperature of the exhaust gas becomes equal to or greater than 500° C.

7. The waste heat recovery device according to claim 1, wherein the mode-switching valve is biased into the closed position, the pressure of the working fluid moving the mode-switching valve to an open position.

* * * * *